US005740346A

United States Patent [19]
Wicki et al.

[11] Patent Number: 5,740,346
[45] Date of Patent: Apr. 14, 1998

[54] SYSTEM AND METHOD FOR DYNAMIC NETWORK TOPOLOGY EXPLORATION

[75] Inventors: Thomas M. Wicki, Palo Alto, Calif.; Patrick J. Helland, Redmond, Wash.; Wolf-Dietrich Weber, La Honda; Winfried W. Wilcke, San Jose, both of Calif.

[73] Assignee: Fujitsu, Ltd., Japan

[21] Appl. No.: 605,676

[22] Filed: Feb. 22, 1996

[51] Int. Cl.$^6$ .................................................. H04L 12/56
[52] U.S. Cl. .................... 395/182.02; 370/352; 370/400
[58] Field of Search ..................... 395/182.02, 200.17, 395/200.15, 200.18, 200.21, 850, 849; 340/825.06; 370/405, 248, 389, 406, 352–356, 396, 404, 408, 449, 450, 386

[56] References Cited

U.S. PATENT DOCUMENTS

| 5,455,865 | 10/1995 | Perman | 380/49 |
|---|---|---|---|
| 5,485,578 | 1/1996 | Sweazey | 395/200.11 |
| 5,495,479 | 2/1996 | Galaand et al. | 370/60 |
| 5,499,237 | 3/1996 | Richetta et al. | 370/54 |
| 5,590,117 | 12/1996 | Iida et al. | 370/248 |
| 5,600,637 | 2/1997 | Kikuta | 370/389 |
| 5,602,839 | 2/1997 | Annapareddy et al. | 370/405 |
| 5,619,497 | 4/1997 | Gallagher et al. | 370/394 |
| 5,627,766 | 5/1997 | Beaven | 364/551.01 |

FOREIGN PATENT DOCUMENTS

| 0 404 423 A2 | 12/1990 | European Pat. Off. | H04L 12/56 |
|---|---|---|---|
| 195 26 001 A1 | 2/1996 | Germany | H04L 12/00 |

Primary Examiner—Robert W. Beausoliel, Jr.
Assistant Examiner—Nadeem Iqbal
Attorney, Agent, or Firm—Fenwick & West LLP

[57] ABSTRACT

A system and method dynamically determines the topology of a source node routing network while having a minimal effect on network performance and without requiring expensive hardware to implement. A source node generates a ping frame. The source node transmits the ping frame to a first source router that is coupled to the source node. The first router transparently identifies the frame as a ping frame and creates an echo frame that is transmitted back to the source node. The first router identifies the port from which the ping frame is received and places this information in the header of the echo frame along with an echo frame identifier. The source node receives the echo frame and identifies routers and nodes to which a ping frame has not been sent based upon the connectivity information in the received echo frame. The source node continue generating and transmitting ping frame to all nodes and routers in the network. The source node identifies loops in the topology to avoid repetitive checking and identifies link and router failures. The topology exploration technique is transparent to the routers The topology exploration techique can be implemented during slow traffic periods with no increase in network latency or the technique can be implemented during high traffic periods and result in only a minimal increase in system latency because ping frames are small and are transparently sent to the control frame handler of the destination router or node.

15 Claims, 10 Drawing Sheets

Figure 9(a)
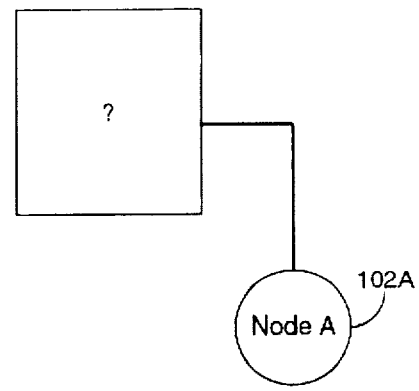
Figure 9(b)
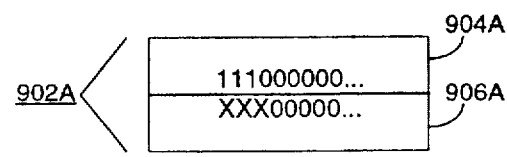
Figure 9(c)
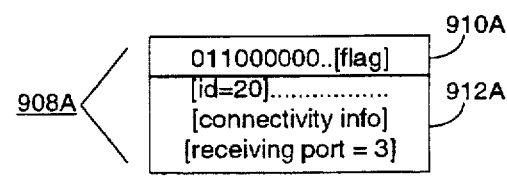
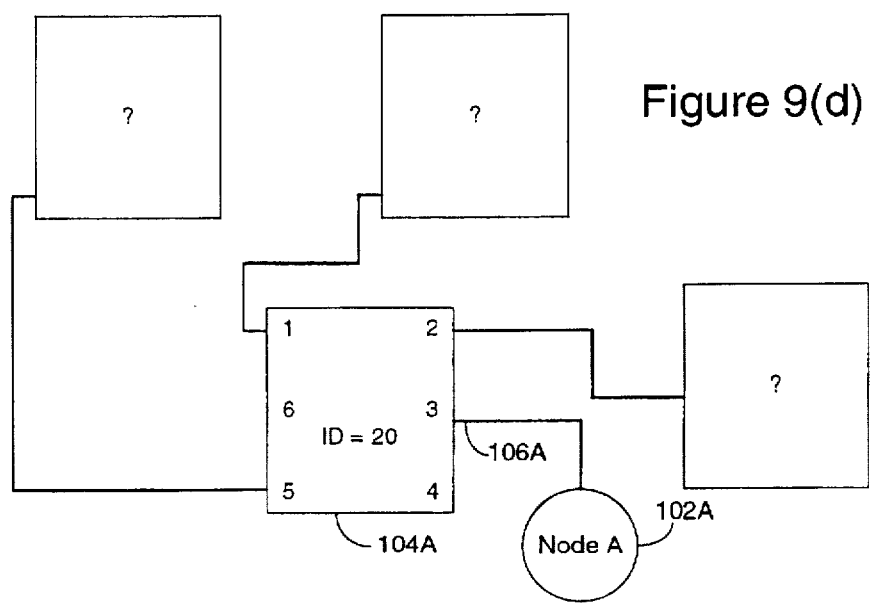
Figure 9(d)

Figure 9(e)
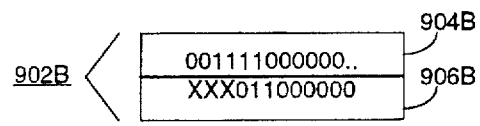
Figure 9(f)
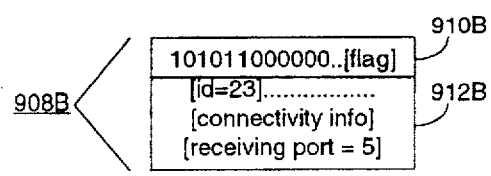
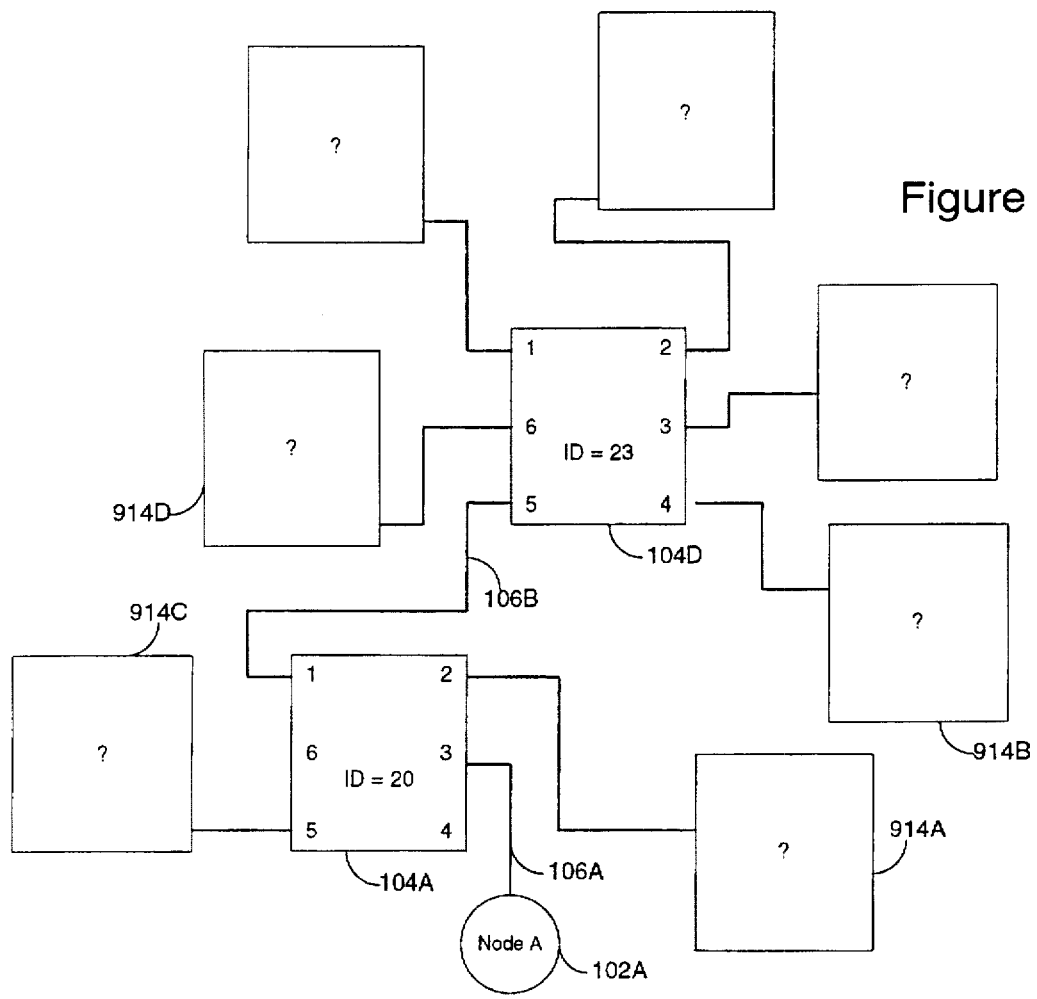
Figure 9(g)

_(5,740,346)_

SYSTEM AND METHOD FOR DYNAMIC NETWORK TOPOLOGY EXPLORATION

CROSS-REFERENCES TO RELATED APPLICATIONS

The subject matter of this application is related to the subject matter of the following applications:

application Ser. No. 08/605,677, attorney docket number 2268, entitled "ASYNCHRONOUS PACKET SWITCHING" filed on Feb. 22, 1996, by Thomas M. Wicki, Patrick J. Helland, Takeshi Shimizu, Wolf-Dietrich Weber, and Winfried W. Wilcke;

application Ser. No. 08/603,926, attorney docket number 2270, entitled "LOW LATENCY, HIGH CLOCK FREQUENCY PLESIOASYNCHRONOUS PACKET-BASED CROSSBAR SWITCHING CHIP SYSTEM AND METHOD" filed on Feb. 22, 1996, by Thomas M. Wicki, Jeffrey D. Larson, Albert Mu, and Raghu Sastry;

application Ser. No. 08/603,880, attorney docket number 2271, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki;

application Ser. No. 08/604,920, attorney docket number 2272, entitled "CROSSBAR SWITCH AND METHOD WITH REDUCED VOLTAGE SWING AND NO INTERNAL BLOCKING DATA PATH" filed on Feb. 22, 1996, by Albert Mu, and Jeffrey D. Larson;

application Ser. No. 08/603,913, attorney docket number 2274, entitled "A FLOW CONTROL PROTOCOL SYSTEM AND METHOD" filed on Feb. 22, 1996, by Thomas M. Wicki, Patrick J. Helland, Jeffrey D. Larson, Albert Mu, and Raghu Sastry, Richard L. Schober, Jr.;

application Ser. No. 08/603,911, attorney docket number 2275, entitled "INTERCONNECT FAULT DETECTION AND LOCALIZATION METHOD AND APPARATUS" filed on Feb. 22, 1996, by Raghu Sastry, Jeffrey D. Larson, Albert Mu, John R. Slice, Richard L. Schober, Jr., and Thomas M. Wicki;

application Ser. No. 08/603,923, attorney docket number 2277, entitled, "METHOD AND APPARATUS FOR DETECTION OF ERRORS IN MULTIPLE-WORD COMMUNICATIONS" filed on Feb. 22, 1996, by Thomas M. Wicki, Patrick J. Helland and Takeshi Shimizu;

application Ser. No. 08/603,882, attorney docket number 2278, entitled "CLOCKED SENSE AMPLIFIER WITH POSITIVE SOURCE FEEDBACK" filed on Feb. 22, 1996, by Albert Mu;

BACKGROUND OF THE INVENTION

1. Field of the Invention

The present invention relates generally to the field of network analysis, and more particularly to a system and method for dynamically determining a topology of a source node routing packet switching network during a computer boot process or during on-line operation.

2. Description of Background Art

There are many techniques used by computer networks to efficiently and reliably transfer information between terminals (nodes) of a network. One such technique is packet switching. In packet switching, a transmitting node sends a frame to a receiving node. The message is divided into many variable-size portions. These portions are called packets. Each packet includes a data portion, a packet header, and, frequently, error detecting information, e.g., parity. The data portion includes the information in the message that is to be sent along with other protocol information from higher layers in the network, e.g., the application layer, presentation layer, session layer, as set forth in an OSI reference model. The packet header includes information relating to, among other information, the location of the packet in the packet sequence.

In order to transport the packets between nodes of the network, additional information is required. This additional information is stored in a frame header. A frame header is added to the packets and the combination of a packet and a frame header is called a frame. Each network limits the size of a frame, therefore, if the packet is too large to fit in a single frame, the packet will be separated into two or more frames. The information included in the packet includes information identifying the ultimate destination node for the frame.

The source node and the destination node are frequently not directly connected in a network environment. Each node is connected to at least one router by a link or signal line. The network can include many routers. In order to transmit a frame from a source node to a destination node the frame typically traverses through a plurality of links and routers. The path of the frame through the network is called the route of the frame. There are many techniques that can be used to route a frame through the network. Some conventional routing techniques include flood routing, random routing, directory routing, and adaptive directory routing. The flood routing technique transmits a frame over all possible paths in the network between the source node and the destination node. The flooding technique will ensure that a frame is successfully transmitted and received, if any valid path exists. However the traffic on the network is significantly increased because each frame is sent multiple times. In the random routing technique, a frame is randomly sent from a source node to a router and the process repeats until the destination receives the frame. Each frame "wanders" around the network and eventually reaches the destination node. The probability of selecting a particular signal line from a router can be biased based upon traffic, line capacity or other network conditions. The problem with random routing is that the latency of a system is significantly higher when the network has a large number of routers since the frame may not take a direct path from the source node to the destination node.

A third routing technique is called directory routing, or source node routing. In directory routing each source node includes a routing table that indicates the path through the network that is chosen for a particular destination node. The routing table is developed "off-line" and is not dynamically modifiable. However, if memory restrictions require that only one path be included for each destination node and a link on the path is broken, then no frames traveling on this broken path will be successfully transmitted. A fourth routing technique is called adaptive directory routing. In adaptive directory routing each router has a routing table in memory indicating the best route through the network for an adjacent router or node. The entries in the routing table can be modified in real time. One problem with conventional adaptive routing techniques is that the router determines the most efficient route for the frame based upon one or more network parameters, e.g., frame delay. Since the routers dynamically route the frames, the latency of each router is more than the latency of each router in the directory routing technique. Since the router of the frame is not completely determined by the source node, the adaptive directory routing technique is not utilized by source node routing networks.

A benefit of source node routing networks is that the routers do not need to create any routing instructions, i.e., the routers are instructed by the source node as to where to route the frame. Therefore, the cost of such routers is less than the cost of routers that perform dynamic routing. A second benefit of source node routing networks is that the latency of these networks is reduced. That is, the time required to route a frame through each router is decreased when compared to networks utilizing dynamic routing, e.g., in a flood routing or random routing technique. The latency decreases in source node routing networks because the router does not need to dynamically determine the path of the frame through the network, instead the router merely reads the frame header to determine the next receiving router that is a quicker operation that dynamically determining the routing information.

Since the route of the frame through the network is determined when the frame is generated in a source node routing network, each node has a routing table that identifies at least one path through the network to all other nodes. As described above, in conventional source node routing systems such routing tables are predetermined and static. That is, the routing table is constructed when the system is off-line. In addition, modifications to the routing table also occur when the node is off-line. In some source node routing networks, a routing table in any node is modified only when the entire network is not operating.

Modifying the routing table can occur during system boot time, if a link is inoperative, another link, router, or node is added or deleted, or in heavy traffic situations to reduce the flow of frame traffic on a particular portion of the network. Occasionally, a network link between a node and a router or between two routers becomes inoperable (fails) and therefore frame traffic across this failed link is disrupted. Since the frame path through the network is predetermined and static, all frames that are routed through this failed link will not reach their destination and are deemed lost. If node A has a routing table where the only route from node A to node B stored in the routing table requires the frame to pass through the broken link, then no frames will be successfully sent from node A and received at node B, even though other routes may be available in the network. Similarly, if a node, router, or link is added to the network the routing table should be modified to account for these additional network elements. If a router becomes non-operational then all traffic routed through this router will be lost. In the above situations, for example, the routing table must be modified to reflect the change in network topology, e.g., an additional router, node, or link, or a non-operational router, node, or link. However, as described above, in some conventional source node routing networks, the routing table can only be modified when the node in which the routing table is present or when the entire network is not operating.

It is expensive in terms of network performance and node performance to make the node non-operational for the purpose of modifying the routing table. If the node handles a high volume of frame traffic it is possible that only a small percentage of frames are affected by an inoperative link and by turning off the node all of the traffic flowing to and from the node is stopped. In addition, all nodes that can route through the inoperative link must also stop operating in order to modify their routing tables.

Even in the adaptive directory routing technique, the ability to modify the routing tables in source nodes comes at the price of decreased network performance and increased network latency.

What is needed is a system and method for efficiently and dynamically determining the topology of a source node routing network without requiring the network to stop operating or to significantly reduce the performance of the network. The method should have a minimal effect on network performance without requiring expensive hardware.

SUMMARY OF THE INVENTION

The present invention is a system and method for dynamically determining the topology of a source node routing network while having a minimal effect on network performance and without requiring expensive hardware to implement. In the present invention a source node generates a ping frame. The ping frame includes a special code in the ping frame header to differentiate a ping frame from a data frame. The source node transmits the ping frame to a first router that is coupled to the source node. The first router transparently identifies the frame as a ping frame and routes the ping frame to an internal control frame handler. The control frame handler creates an echo frame that is transmitted back to the source node. The first router identifies the port from which the ping frame is received and places this information in the header of the echo frame along with an echo frame identifier. The body of the echo frame includes a first router identification code, identification of the port from which the ping frame is received, and connectivity information, i.e., information relating to whether a network element is connected to each port of the first router.

The source node receives the echo frame and identifies routers and nodes to which a ping frame has not been sent based upon the connectivity information in the received echo frame. After selecting another node or router, e.g., a second router, the source node generates a second ping frame. The second ping frame is generated and operates in the same manner as the first ping frame. However, the second ping frame has a different destination, therefore, the second ping frame includes different information that the first ping frame. This ping frame includes routing information in the frame header and includes return routing information in the frame body in order to minimize the routing decisions required to be made by the router. The second ping frame is sent to the second router via the first router. The second router transparently determines that the frame is a ping frame and sends the frame to its control frame handler. The control frame handler strips the ping frame header and creates an echo frame header from the routing information in the body of the ping frame. The second router identifies the port from which the ping frame is received and places this information in the header of the echo frame along with an echo frame identifier. The body of the echo frame includes a second router identification code, the port number of this router that received the ping frame, and connectivity information. The second router then transmits the echo frame back to the source node.

The source node continues generating and transmitting ping frames to all nodes and routers in the network. The source node identifies loops in the topology to avoid repetitive checking and identifies link and router failures. The topology exploration technique is transparent to the routers. The topology exploration technique can be implemented during slow traffic periods with no increase in network latency or the technique can be implemented during high traffic periods and result in only a minimal increase in system latency because ping frames are small and are transparently sent to the control frame handler of the destination router or node.

BRIEF DESCRIPTION OF THE DRAWINGS

FIGS. 9(a)–9(g) are examples of the topology exploration technique according to the preferred embodiment of the present invention.

DETAILED DESCRIPTION OF THE PREFERRED EMBODIMENT

A preferred embodiment of the present invention is now described with reference to the figures where like reference numbers indicate identical or functionally similar elements. Also in the figures, the left most digit(s) of each reference number correspond(s) to the figure in which the reference number is first used.

Figure 1:
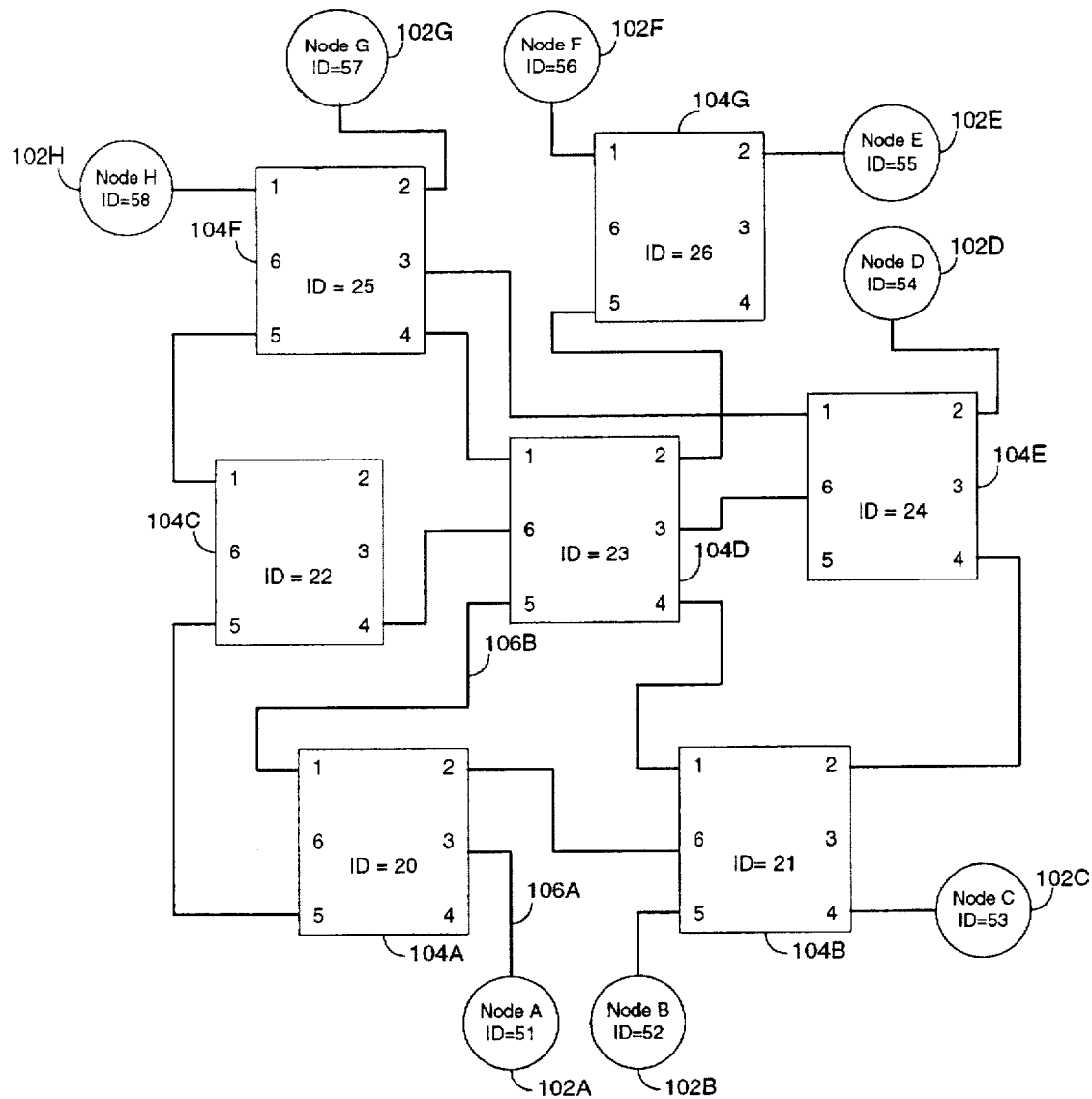
FIG. 1 is an example of an illustration of a source node routing network topology including nodes and routers according to the preferred embodiment of the present invention.

FIG. 1 is an example of an illustration of a source node routing network topology including nodes and routers according to the preferred embodiment of the present invention. The network in FIG. 1 includes eight nodes 102, i.e., Nodes A–H 102A–H, and seven routers 104A–F. Each node 102 and each router 104 has a unique identification code that is used by the source node to identify routers and topology loops in the topology exploration technique. For example, the identification code for the first router 104A is 20. The nodes and routers, together the network elements, are connected by links 106. Each link 106 is a full-duplex communication signal line. That is, each link is capable of simultaneous carrying two independent signals in opposite directions, i.e., one signal is received by router 104A from the source node 102A and one signal is simultaneously transmitted by router 104A to the source node 102A. Accordingly, each link 106 can be represented as two half-duplex communication signal lines, as shown and described below with reference to FIG. 2 and FIG. 10. As described below, the present invention is a system and method that enables each node 102 to dynamically determine the topology of a network.

Figure 2:
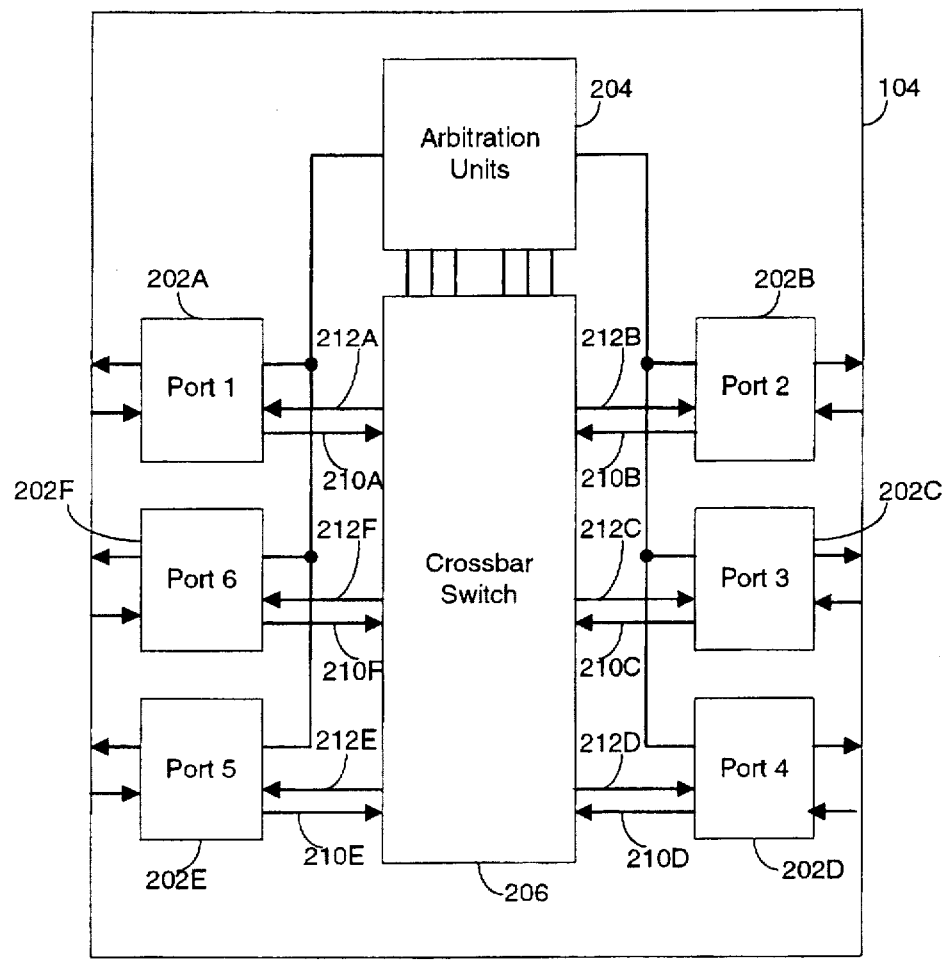
FIG. 2 is a more detailed illustration of a router in a source node routing network according to the preferred embodiment of the present invention.

FIG. 2 is a more detailed illustration of a router in a source node routing network according to the preferred embodiment of the present invention. FIG. 2 includes six ports 202A–F. In alternate embodiments, the router includes a different number of ports, e.g., two ports or thirty ports. Each port, e.g. Port 1 202A, is coupled to the duplex communications signal line 106. Each port 202 is also connected to the arbitration units 204. The arbitration units 204 are described in greater detail below and with reference to a co-pending patent application entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki, that was cross referenced above and is incorporated by reference herein in its entirety. Each port is connected to a crossbar switch 206 via buffer signal lines 210. The operation of the crossbar switch 206 is described in greater detail below with reference to FIG. 3 and is described, in a slightly modified form, in co-pending patent application entitled "CROSSBAR SWITCH AND METHOD WITH REDUCED VOLTAGE SWING AND NO INTERNAL BLOCKING DATA PATH" filed on Feb. 22, 1996, by Albert Mu, and Jeffrey D. Larson, that was cross-referenced above and is incorporated by reference herein in its entirety. In the preferred embodiment each buffer signal line 210A includes six connection signal lines for connecting each buffer, described below, with the crossbar switch 206. The operation of the router 104 is described in greater detail below with reference to FIGS. 3–9.

Figure 10:
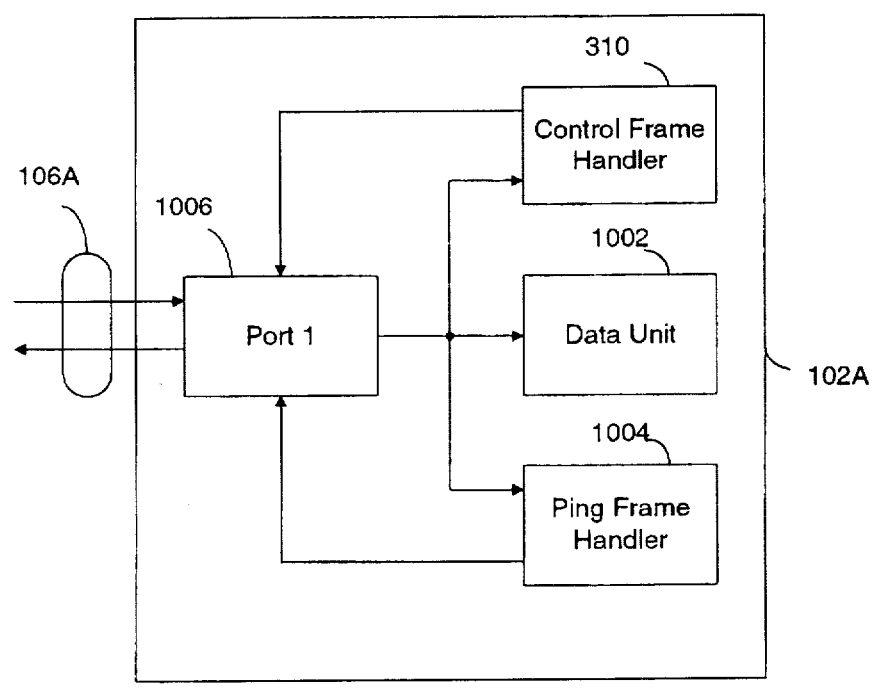
FIG. 10 is a more detailed illustration of a node in a source node routing network according to the preferred embodiment of the present invention.

FIG. 10 is a more detailed illustration of a node, e.g., Node A 102A, in a source node routing network according to the preferred embodiment of the present invention. FIG. 10 includes the portions of Node A 102A that are involved in the topology exploration process. The node is coupled to a duplex communication signal line 106A, described above. A frame is received by Port 1 1006. The operation of port 1 1006 is similar to the operation of the ports 202 described below. Port 1 1006 determines if a received frame is a data frame, a ping frame, or an echo frame, as described below. If the frame is a ping frame, the frame is sent to the control frame handler 310. The control frame handler 310 is described in greater detail below. If the frame is a data frame, the frame is sent to a data unit 1002. If the frame is an echo frame, the frame is sent to the ping unit 1004. The ping unit 1004 reads the information included in the echo frame and updates the routing table based upon this information. In addition, the ping unit 1004 generates the ping frame. The control frame handler 310 and the ping unit 1004 can be implemented in either hardware or software. The operation of the ping unit 1004 is described in greater detail below.

Figure 3:
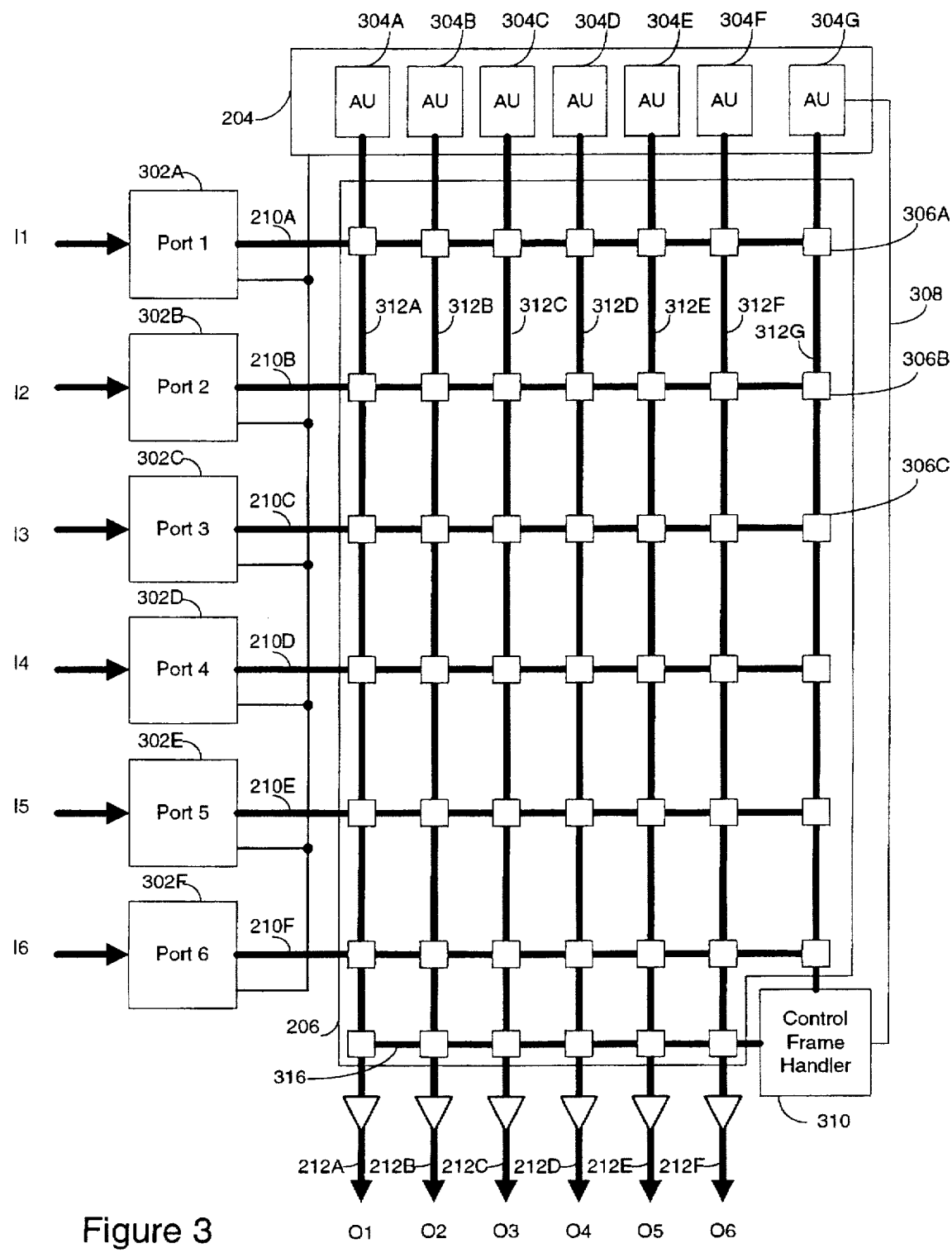
FIG. 3 is a more detailed illustration of the cross-point matrix according to the preferred embodiment of the present invention.

FIG. 3 is a more detailed illustration of the router 104 and the cross-point matrix 206 according to the preferred embodiment of the present invention. Each port 202 of the router 104 includes a port input 302, e.g., port 1 input 302A. Each port input 302 includes, for example, six buffers (not shown) that store frames received at the port input 302. Each buffer is coupled to the crossbar switch 206. In order to simplify FIG. 3, only buffer signal line 210 is shown coupling each port 302 to the crossbar switch 206. As described above, each port has six buffers and each buffer is connected to the crossbar switch 206 via a buffer signal line 210. Accordingly, each of the six ports 202 includes six connections, for a total of 36 buffer signal lines 210. Similarly, each of the 36 buffer signal lines 210 is coupled to seven cross point circuits 306. In order to simplify FIG. 3 only seven of the cross point circuits 306 are shown for each port 202.

The router 104 includes seven arbitration units 304. Six of these arbitration units 304A–F are coupled to output signal lines 212A–F via crossbar switch output signal lines 312A–F. The seventh arbitration unit is coupled to a control frame handler 310 via crossbar switch output signal line 312G. In addition, the seventh arbitration unit 304G is directly coupled to the control frame handler 310 via a control line 308. The crossbar switch output signal lines 312A–G are connected to each output signal line 212 via a cross point circuit 306.

A general overview of the operation of the router 108 is now set forth. A frame is received in a port 202 of a router 104, e.g., port 1 202A. The frame is received by a data synchronizer (not shown) that determines if the received frame is a data frame or a ping frame based upon information in the frame header. If the received frame is a data frame, the data frame is stored in a buffer in the Port 1 input 302A. The arbitration units 304 determine if the data in each buffer can be transmitted to another node or buffer through a port 202. If a data frame is received at Port 1 202A, the output port to which the data frame is to be sent is determined by the arbitration unit 304. When the arbitration unit 304 indicates that a data frame can be sent on the output port, the arbitration unit couples the buffer having the data frame to the appropriate output port using the crossbar switch 206. A more detailed description of the operation of the crossbar switch 206 is provided in the patent application entitled "CROSSBAR SWITCH AND METHOD WITH REDUCED VOLTAGE SWING AND NO INTERNAL BLOCKING DATA PATH" filed on Feb. 22, 1996, by Albert Mu, and Jeffrey D. Larson, cited above. A more detailed description of the operation of the arbitration units 304 is provided in the patent application entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki, cited above.

If the received frame is a ping frame, the ping frame is stored in a buffer and the seventh arbitration unit 304G connects the ping frame to the control frame handler 310 via a cross point circuit 306. Accordingly, the crossbar switch 208 handles a ping frame transparently because it is switched in the same manner as data frames. However, instead of being switched to an output port, the ping frame is switched to a control frame handler 310 and the crossbar switch 208 can simultaneously switch other frames that are stored in other buffers to the appropriate output signal line 212. The ping frame is received by the control frame handler 310. The control frame handler 310 creates an echo frame that includes router information, receiving port information, and connection information. The control frame handler 310 then sends the echo frame back to the source node. The operation of the control frame handler 310 and the operation of the router when receiving a ping frame and transmitting an echo frame is described below with reference to FIGS. 4–9.

Figure 4:
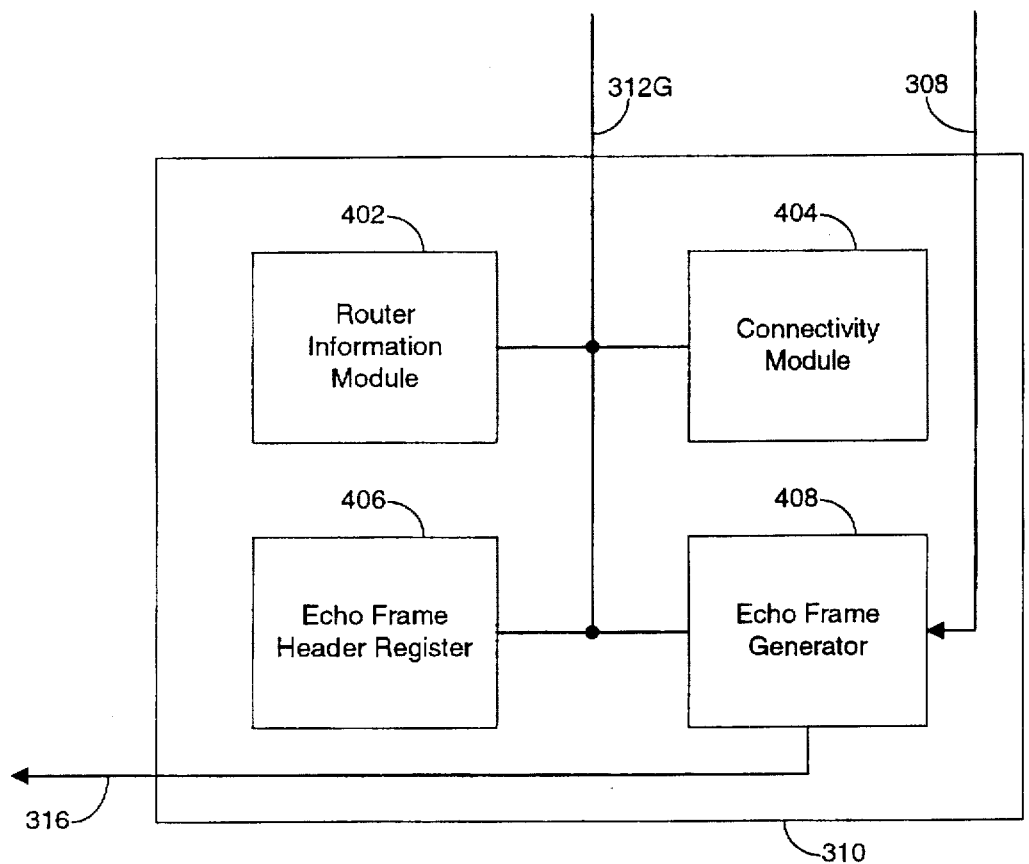
FIG. 4 is a more detailed illustration of the control frame handler according to the preferred embodiment of the present invention.

FIG. 4 is a more detailed illustration of control frame handler 310 according to the preferred embodiment of the present invention. The control frame handler 310 includes a router information module 402, a connectivity module 404, an echo frame header register 406, and an echo frame generator 408. The router information module 402 includes the router identification code. The connectivity module 404 includes information detailing how each port 202 is connected, i.e., if a port 202 is connected to another port or node, or if the port is unconnected (open). The echo frame header register 406 stores echo frame header information. As described below, the echo frame header register 406 includes the first 8.5 bytes of information in the ping frame body, i.e., the first 8.5 bytes after the ping frame header. The echo frame generator 408 generates the echo frame in response to a ping frame. The echo frame header register 406 receives the ping frame via the crossbar switch signal line 312G, and receives information from the router information module 402, the connectivity module 404, and the echo frame header register 406. In addition, the echo frame generator 408 receives a control signal 308 from the seventh arbitration unit 304G that includes a receiving port identifier. The receiving port identifier identifies the port from which the ping frame is received. The seventh arbitration unit 304G transmits the receiving port identifier to the echo frame generator 408 that places this information in the echo frame header, so the frame is transmitted back to the source node using the same route as the ping frame. In addition the receiving port identifier is stored in the echo frame, the receiving port identifier is utilized by the source node when determining future routing information for echo nodes, as stored in the ping frame body. The operation of the echo frame generator is described in greater detail below with reference to FIGS. 5–9.

Figure 5:
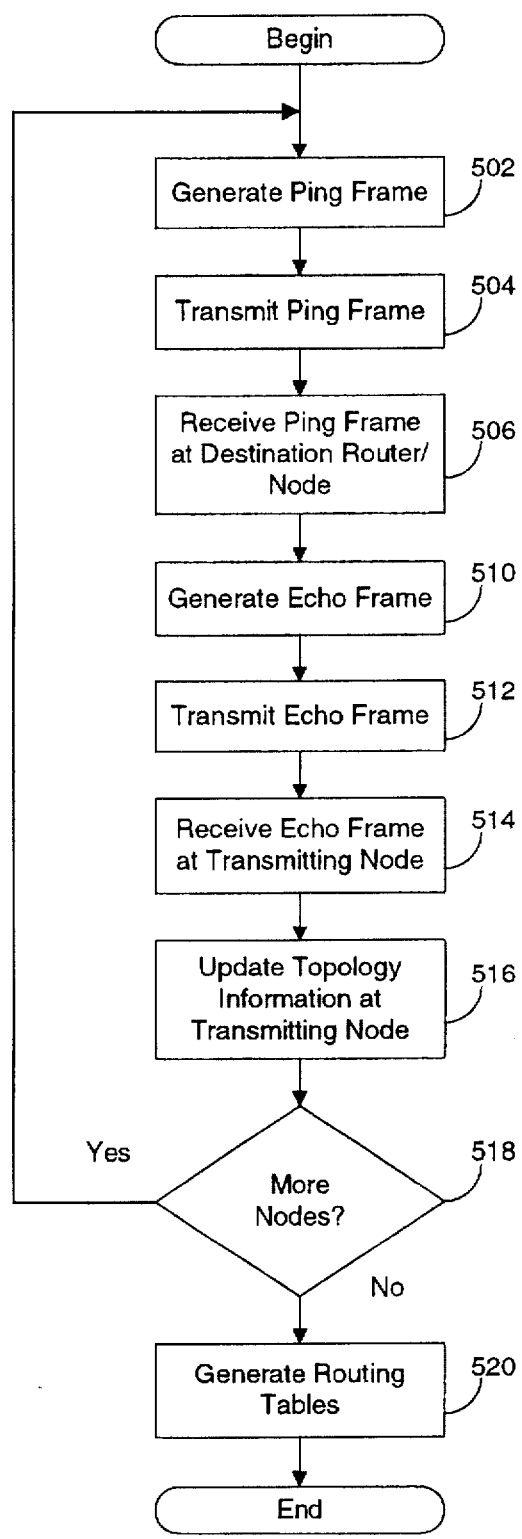
FIG. 5 is a flow diagram of the topology exploration technique of the preferred embodiment of the present invention.

FIG. 5 is a flow diagram of the topology exploration technique of the preferred embodiment of the present invention. The technique will be described with reference to FIG. 1 and FIGS. 9(a) through 9(g). FIGS. 9(a)–9(g) are examples of the topology exploration technique according to the preferred embodiment of the present invention. The present invention can be used in situations where a routing table in a source node, e.g., source node 102A, needs to be initialized at boot time of the system or is not accurate and should be modified. As described above, modifying the routing table can occur if a link is inoperative, another link, router, or node is added or deleted to the network, or when one or more links are causing a transmission delay because of high traffic flow, for example. As described above, occasionally a network link between a node and a router or between two routers becomes inoperable and therefore frame traffic across this failed link is disrupted. Since the frame path through a source node routing network is predetermined and static, all frames that are routed through this failed link will not reach their destination and are deemed lost. If the source node 102A has a routing table where only one route from the source node 102A to a destination node, e.g., node 102F, is stored in the routing table and a link on this route fails, then no traffic will be successfully transmitted from the source node 102A to the destination node 102F. However, there can be alternate routes that can be used that would result in a successful transmission. In this situation, the routing table must be modified to identify an alternate route through the source node routing network. Similarly, if a node, router, or link is added to the network the routing table should be modified to account for these additional network elements. If a router becomes non-operational then all traffic routed through this router will be lost. In the above situations, the routing table should be modified to reflect the change in network topology.

In one embodiment of the present invention the topology exploration system and method are used in a source node routing network in a system having an architecture of physically distributed, but logically shared memories. Accordingly, a node, e.g., a processing node, can request access to a memory location that is physically located at a different location and is coupled to a different node. The requesting node or source node identifies the location of the memory and the network quickly retrieves the data. If one link is inoperative, the data request will be unsuccessful. In such a system it is expensive to turn off the entire system to modify the routing tables in one or more nodes, as is required in conventional systems or to modify the routing tables using a technique that increases the latency of the network, e.g., in a system where the routers 104 make routing decisions. The present invention is a system and method for dynamically determining the topology of the network and updating the routing tables without significantly interfering in the execution and latency of the system.

The topology exploration procedure of the present invention can be triggered in many ways including at system boot-time "losing" a predetermined number of consecutively transmitted frames and performing the procedure after a predetermined period of time. With reference to FIG. 9(a), the network topology known by the source node 102A before transmitting the first ping frame is shown. That is, the source node 102A knows that it is connected to a circuit element, e.g., a node or a router, but does not have any specific information describing this element. The source node begins the topology exploration process by generating 502 a ping frame. The ping frame generation technique is described in greater detail below with reference to FIG. 6 and FIG. 9(b).

Figure 6:
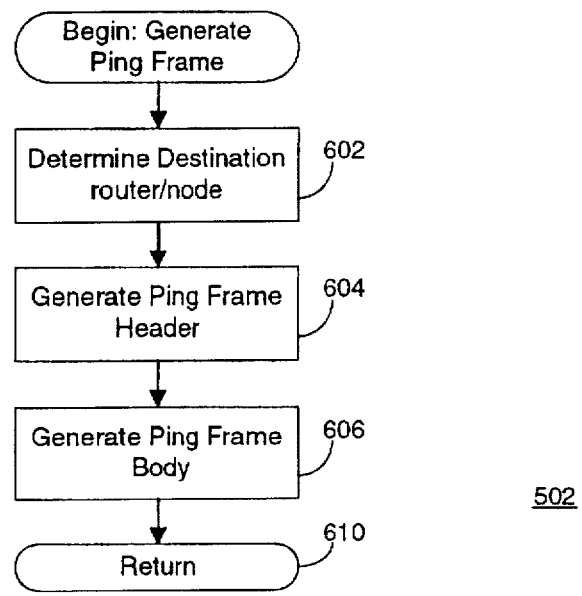
FIG. 6 is a flow diagram of a ping frame generation technique according to the preferred embodiment of the present invention.

FIG. 6 is a flow diagram of a ping frame generation technique according to the preferred embodiment of the present invention. The source node 102A determines 602 the destination element. When generating a first ping frame 902A, as shown in FIG. 9(b), a source node 102A having only a single connection to the remaining network elements will select the only element connected thereto. The source node 102A generates 604 a ping frame header 904A. The ping frame header 904A includes routing information and a ping frame identification code. In the preferred embodiment; the ping frame identification code is a three-bit binary representation of the value 7, i.e., 111, and is located in the three most significant bits of the frame header although the precise location of these bits can differ in alternate embodiments. In the preferred embodiment, the first three bits identify the output port that a receiving router will send the frame. These three bits identify the arbitration unit 304 to connect the frame to the appropriate output port. For example, if the three bits represent a binary representation of 1, then the first arbitration unit 304A is notified that data is stored in a particular buffer that is to be output using output port 1 ("O1", in FIG. 3).

When the routing information is a binary representation of 7, these three bits identify the seventh arbitration unit 304G. The seventh arbitration unit 304G causes crossbar switch 206 to connect the buffer to the control frame handler 310 by activating an appropriate cross point circuit 306, as described below. A three bit binary representation of zero notifies the receiving element that the received frame has reached its destination, if the receiving element is a node, or that an error condition has occurred, e.g., a transmission error or a faulty entry in the routing table, if the element is a router. Accordingly, the first ping frame header 904A is shown in FIG. 9(b) and has the three most significant bits equal to 111, and the next three most significant bits equal to 000. The source node 102A generates 606 a frame body 906A that includes routing information for the echo frame, as described below. However, no such routing information is required for the first ping frame because the first echo frame is transmitted directly to the source node via the same port that it is received. Therefore, the first ping frame body 906A does not include any routing information. After generating 502 the first ping frame, the source node transmits 504 the ping frame.

The ping frame is received 506 by the destination element, e.g., router 104A. As described above, the ping frame header 904A is read by the port input, e.g., the port 3 input of router 104A, that notifies the seventh arbitration unit 304G that a ping frame is received. The port 3 input identifies the frame as a ping frame by the value of three most significant bits in the frame header 904A, i.e., 111. The seventh arbitration unit 304G instructs the cross point circuit 306C to connect the seventh crossbar switch output signal lines 312G and the input port 302C to transmit the ping frame 902A. As a result, the ping frame 902A is received by the control frame handler 310. The control frame handler 310 generates 510 a first echo frame in response to the first ping frame. The echo frame generation technique is described below with reference to FIG. 7 and FIGS. 9(b)–(c).

Figure 7:
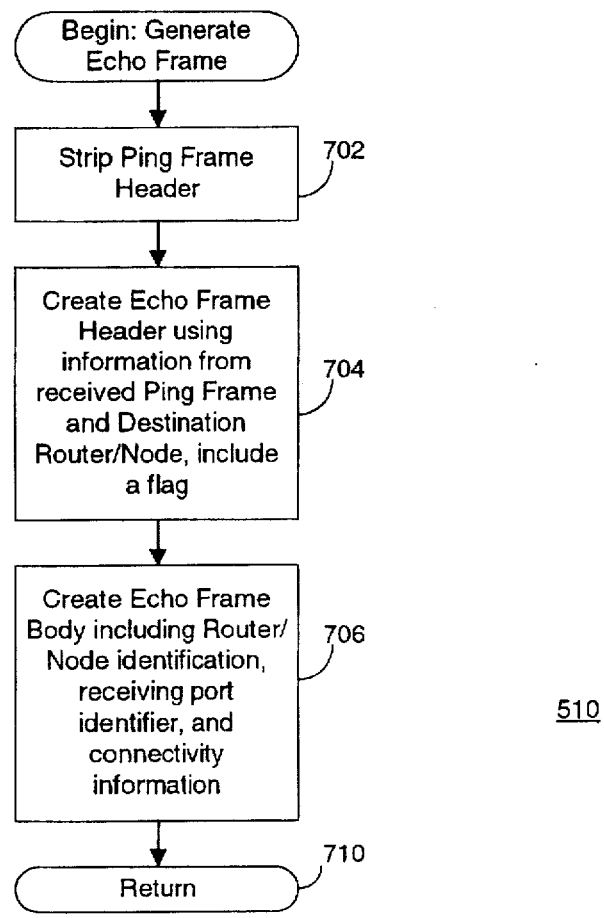
FIG. 7 is a flow diagram of a echo frame generation technique according to the preferred embodiment of the present invention.

FIG. 7 is a flow diagram of an echo frame generation technique according to the preferred embodiment of the present invention. The control frame handler 310 receives from the arbitration unit 304G via control signal line 308 the input port 302 from which the ping frame was received. The router information module 402 includes the unique identification code of the router, e.g., the router identification code for the first router 104A is 20. The control frame handler 310 strips 702 the ping frame header off of the ping frame and stores the first line of the first ping frame body 906A in the echo frame header register 406. In the preferred embodiment, the echo frame header is 8.5 bytes. The control frame handler 310 retrieves the connectivity information of the router from the connectivity module 404. The connectivity information identifies the status of each port, i.e., whether a network element is connected thereto. For example, for the first router 104A, ports 1, 2, 3, and 5 are connected to a network element and ports 4 and 6 are unconnected. The control frame handler 310 also receives a control signal from the seventh arbitration unit 304G on the control signal line 308.

After receiving the control signal, the echo frame generator 408 creates 704 the echo frame 908A. The three most significant bits of the echo frame header 910A are equal to the port from which the first ping frame was received, i.e., port 3 or 011 binary. Since the first router 104A is directly connected to the source node 102A via the third port, the next three most significant bits are 000 and represent that the echo frame has reached its destination. The echo frame header 910 also includes a flag identifier, e g., located in the least significant bit of the echo frame header, that identifies the frame as an echo frame as opposed to a data frame. The echo frame generator then creates 706 the echo frame body 912A. The echo frame body includes the router identification code, e.g., 20, the receiving port identifier, e.g., port 3, and the connectivity information. The echo frame generator 408 transmits 512 the first echo frame 908A to the source node via port 3, as identified in the echo frame header 910A. The first echo frame is received 514 by the source node 102A and the source node 102A updates 516 its network topology information.

Figure 8:
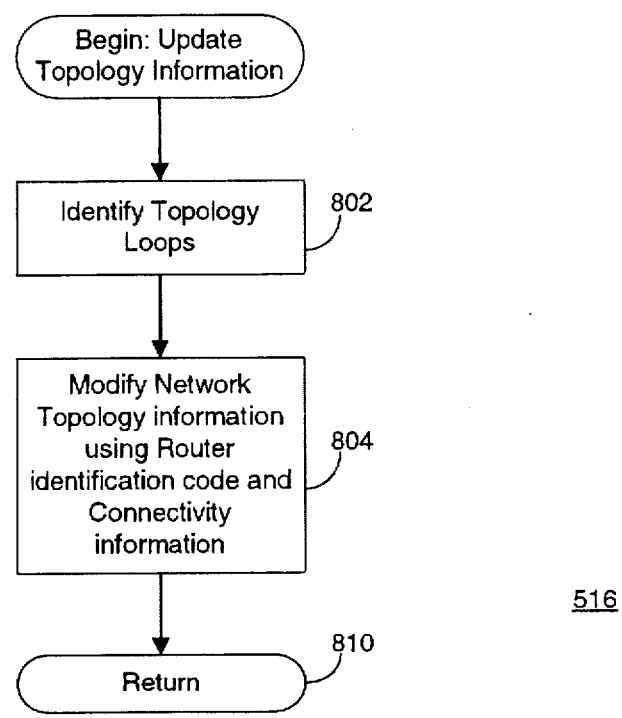
FIG. 8 is a flow diagram of a topology information updating technique according to the preferred embodiment of the present invention.

FIG. 8 is a flow diagram of the topology information updating technique according to the preferred embodiment of the present invention. The source node 102A identifies 802 any topology loops. This identification is accomplished by comparing network element identification codes. Then the source node modifies 804 the network topology information using the router identification code and the connectivity information. FIG. 9(d) illustrates the network topology known to the source node 102A after receiving the first echo frame. Node A knows it is connected to a first router 104A having an identification code of 20 via the port 3 of the first router 104A. Ports 1, 2, and 5 of the first router 104A are connected to other network elements, ports 4 and 6 of the first router 104A are unconnected and port 3 is connected to the source node 102A. The source node 102A examines the topology information and determines 518 if all network elements of the network have been explored. In the present example, the elements connected to ports 1, 2 and 5 of the first router 104A have not been explored. Therefore, one of these unexplored elements is selected, e.g., the network element connected to port 1 of the first router 104A, and steps 502–518 are repeated, as described below.

Since all network elements have not been explored, the source node 102A generates 502 a second ping frame. As stated above, the technique for generating the second ping frame is the same as the technique for generating the first ping frame. The differences between the first ping frame and the second ping frame include the ping frame routing information in the ping frame header and the echo frame routing information in the ping frame body. The technique for generating the second ping frame is described below with reference to FIG. 6 and FIG. 9(e). The source node 102A determines the routing information based upon the updated connectivity topology information. The route of the ping frame from the source node 102A to the destination element is from the source node to the first router 104A, then through port 1 of the first router 104A to the destination element connected to the first router 104A. The source node 102A generates 604 the second ping frame header 904B based upon this routing information. Specifically, the three most significant bits of the second ping frame header 904B correspond to the port in the first router 104A through which the second ping frame 902B will be sent, i.e., port 1. Accordingly, these three bits are a binary representation of 1, i.e., 001. The next three most significant bits, i.e., the three most significant bits that will remain in the second ping frame header 904B after the previous three bits are stripped by the first router 104A, are a binary representation of 7, i.e., 111, because the second network element will read these bits and will determine that the received frame is a ping frame, as described above. The source node 102A also generates 606 a second ping frame body 906B. As described above, the first line of the second ping frame body 906B includes routing information for the echo frame. The echo frame routing information is determined by the source node 102A instead of the destination node in order to minimize the logic necessary in the destination node. The first three bits of this line will be the port through which the second ping frame 902B is received in the second element. This port will also transmit the second echo frame from the second element to the first router 104A. The source node 102A does not have this port information yet, therefore, these three bits are "don't care" bits, and are represented by an "X". However, the next three most significant bits represent the route that the echo frame will be received by the first router 104A. The echo frame will be received by the first port of the first router 104A and will be transmitted to the source node 102A through the third port. Accordingly, the next three bits represent a binary representation of 3, i.e., 011. After the first router 104A routes the second echo frame through port 3, the echo frame will be received by the source node 102A. As described above, a three bit representation of zero, i.e., 000, will be interpreted by the source node to mean that the frame has reached its destination. Therefore, the second ping frame 902B is equal to the value shown in FIG. 9(e). After generating the second ping frame 902B, the source node 102A transmits 504 this second ping frame 902B to the first router 104A.

The first router 104A receives the second ping frame 902B and reads the second ping frame header 904B. The first three bits of the second ping frame header 904B identify the port through which the second ping frame 902B should be sent. As described above, these three bits are equal to 001. Accordingly, the first router 104A strips these three bits off of the ping frame header 904B, performs three bit shift operations on the remaining routing bits, and routes the modified second ping frame 902B to the network element connected to port 1 of the first router 104A. This network element is a second router 104D. The second router 104D receives 506 the modified second ping frame 902B and reads the second ping frame header 904B. The first three bits are now equal to 111. As described above, because these bits are equal to 111, the second ping frame is routed to a control frame handler 310 in the second router 104D. The second router 104D generates a second echo frame 908B using the technique described above. Specifically, after receiving a control signal from the seventh arbitration unit 304G in the second router 104D, the echo frame generator 408 strips 702 the second ping frame header 904B, and creates a second echo frame header 910B. The three most significant bits of the second echo frame header represent the port through which the second echo frame 908B will initially be sent, i.e., port 5 or binary 101. The next two sets of three bit fields are equal to 011 and 000, as set by the source node 102A, described above. The second echo frame header 910B also includes a flag indicating to the source node 102A that the received frame is an echo frame as opposed to a data frame. The second router 104D also creates 706 a second echo frame body 912B. The second echo frame body 912B includes an identification code of the second router 104D, e.g., 23, and the input port identifier, i.e., port 5. The second echo frame body 912B also include the connectivity information for the second router 104D. Specifically, the connectivity information indicates that all six ports of the second router 104D are in use.

The second router 104D transmits 512 the second echo frame 908B to the first router 104A through port 5 of the second router 104D. The first router 104A receives the second echo frame 908B, reads the echo frame header 910B to identify the next port in which to route the second echo frame 908B, strips the first three bits of the second echo frame header 910B, and shifts the remaining router bits, as described above. The second router 104D does not identify the second echo frame 908B as an echo frame, instead, the second echo frame 908B is treated by the first router 104A as if it were a data frame. Accordingly, the first router 104A does not need to handle the second ping frame 902B or second echo frame 908B differently from data frames. This feature reduces hardware complexity and reduces network latency when compared to networks requiring addition logic to perform these functions. The first router 104A transmits the second echo frame 908B to the source node 102A via port 3 of the first router 104A as indicated in the second echo frame header 910B. The source node 102A receives 514 the second echo frame 908B and updates 516 the topology information. As described above, the step of updating 516 the topology information is described in greater detail in FIG. 8. The source node identifies 802 any topology loops. In this example, no topology loops have been identified. If a topology loop exists, the source node identifies this loop by comparing the network element identification codes. If two identification codes match then the source node 102A equates these two elements, as described below.

The source node 102A then modifies the network topology information using the router identification code and the connectivity information. FIG. 9(g) illustrates the network topology information known to the source node 102A after receiving the second echo frame 908B. The source node 102A is connected to the first router 104A having an identification code equal to 20. The first router 104A is connected to unknown network elements via ports 2 and 5, is unconnected at ports 4 and 6, is connected to the source node 102A via port 3, and is connected to the second router 104D via port 5. The second router 104D has an identification code equal to 23, and is connected to five unknown network elements on ports 1, 2, 3, 4, and 6, and is connected to the first router 104A via port 5. The source node 102A does not realize that unknown network element 914A is the same as unknown network element 914B. The source node will determine that these two elements are the same after exploring the path from port 2 of the first router 104A and the path from port 4 of the second router 104D and determining that the identification codes of these two unknown elements 914A, 914B are the same. Similarly, after receiving the second echo frame 908B, the source node does not know that unknown elements 914C and 914D are the same. This determination will occur when the source node 102A identifies loops, as described above.

The process continues until all ports have been examined. If a link or element is inoperative, this link or element will be identified because an echo frame will not be received in response to a ping frame. Such a link or element will not be included in the updated topology. The source node 102A then generates 520 routing tables based upon the updated network topology. The updated routing tables can supply alternate paths between network elements, for example to avoid inoperative links, or the routing table can be exhaustively calculated to achieve an optimal solution that avoids all potential loops and minimizes the possibility of overloading a link or a router with frame traffic and avoids network deadlock. Some examples of techniques for updating routing tables are given in R. D. Rosner, *Packet Switching, Tomorrow's Communications Today* (1982) that is incorporated by reference herein in its entirety.

The above example describes when a ping frame is received and an echo frame is generated by a router. The technique for receiving a ping frame and generating and transmitting an echo frame is the same when the destination element is another node.

What is claimed is:

1. A method for dynamically a determining network topology information of a network, the network including a plurality of network elements including a first node and a first element coupled to a destination element, comprising the steps of:

(a) generating a ping frame including first routing information identifying a first route from the first node to the destination element, and second routing information identifying a second route from the first element of said network elements to the first node;

(b) transmitting said first ping frame to said destination element via said first route;

(c) receiving a ping frame at the destination element through a first port of said destination element;

(d) generating an echo frame in response to said ping frame, said echo frame including first connectivity information, third routing information, and a destination element identifier, said first connectivity information identifying network elements that are adjacent to the destination element and said third routing information including said second routing information and an identifier of said first port;

(e) transmitting said echo frame from said destination element to the first node via said third route;

(f) receiving said echo frame at said first node; and (g) updating the network topology information by including said destination element identifier and said first connectivity information.

2. The method of claim 1, wherein said destination element is one of a second node and a router.

3. The method of claim 1, further comprising the step of:

(h) repeating steps (a)–(g) for all of said network elements in the network.

4. The method of claim 3, further comprising the step of:

identifying network elements having the same destination element identifier to identify loops in the network topology.

5. The method of claim 1, further comprising the step of:

(i) determining a router table having a plurality of routes through the network, each route from the first node to one of the network elements based upon said network topology information.

6. The method of claim 5, wherein steps (a)–(i) are performed while the network is operating.

7. The method of claim 5, wherein steps (a)–(i) are performed during network initialization.

8. The method of claim 1, wherein step (g) identifies improperly functioning network elements and improperly functioning network links, said network links coupling said network elements.

9. A system for determining a network topology information of a network, the network including a plurality of network elements including a first node and a first element coupled to a destination element, the system comprising:

a ping frame generator, located in said first node, for generating a ping frame, said ping frame including first routing information identifying a first route from the first node to the destination element, and second routing information identifying a second route from the first element of said network elements to the first node;

a first node transmitter, coupled to said ping frame generator, for transmitting said first ping frame to said destination element via said first route;

an echo frame generator, located in said destination element, for generating an echo frame in response to said ping frame, said echo frame including first connectivity information, third routing information, and a destination element identifier, said first connectivity information identifying network elements adjacent to the destination element and said third routing information including said second routing information and an identifier of said first port;

a ping frame receiver, located in said destination element, disposed to receive said first ping frame and coupled to said echo frame generator, for receiving a ping frame through a first port of the destination element and for transparently transmitting said ping frame to said echo frame generator;

an echo frame receiver, coupled to said echo frame generator, for transmitting said echo frame from said destination element to the first node via said third route; and a topology updating unit, coupled to said ping frame identifier and disposed to receive said echo frame, for updating the network topology information by adding said destination element identifier and said first connectivity information.

10. The system of claim 9, further comprising:

a topology loop identifier, coupled to said echo frame receiver, for identifying network elements having the same identifier to identify loops in the network topology.

11. The system of claim 9, further comprising:

a routing table generator, coupled to said topology updating unit, for generating a routing table including a route through the network from the first node to each of the network elements based upon said updated network topology information.

12. The system of claim 9, wherein said destination element is one of a second node and a router.

13. The method of claim 1, further comprising the step of:

(h) repeating steps (a)–(g) for a second of said network elements in the network, wherein said second network element is identified in said first connectivity information.

14. The method of claim 13, wherein said first routing information is derived from previously received connectivity information.

15. The system of claim 9, wherein said ping frame generator generates a second ping frame addressed to a second destination node identified in said first connectivity information.

* * * * *